United States Patent
Bourne et al.

(10) Patent No.: US 10,713,252 B1
(45) Date of Patent: Jul. 14, 2020

(54) METHODS, SYSTEMS, AND COMPUTER READABLE MEDIUMS FOR PERFORMING AN AGGREGATED FREE-FORM QUERY

(71) Applicant: VCE Company, LLC, Richardson, TX (US)

(72) Inventors: Geoffrey David Bourne, Allen, TX (US); James K. Boettcher, Ashland, MA (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 242 days.

(21) Appl. No.: 15/250,289

(22) Filed: Aug. 29, 2016

(51) Int. Cl.
*G06F 16/00* (2019.01)
*G06F 16/2455* (2019.01)
*G06F 16/2453* (2019.01)

(52) U.S. Cl.
CPC .... *G06F 16/2455* (2019.01); *G06F 16/24534* (2019.01)

(58) Field of Classification Search
None
See application file for complete search history.

(56) References Cited

U.S. PATENT DOCUMENTS

| | | | |
|---|---|---|---|
| 8,799,266 B2 * | 8/2014 | Barsness | G06F 16/24547 707/713 |
| 9,280,535 B2 | 3/2016 | Varma et al. | |
| 9,489,457 B2 | 11/2016 | Regan et al. | |
| 9,767,197 B1 * | 9/2017 | Agarwal | G06F 16/951 |
| 10,037,368 B1 | 7/2018 | Nandyalam et al. | |
| 10,191,734 B1 * | 1/2019 | Totale | G06F 8/36 |
| 2005/0050046 A1 * | 3/2005 | Puz | G06F 17/30427 |
| 2006/0122973 A1 * | 6/2006 | Berg | G06F 17/30286 |
| 2012/0005198 A1 * | 1/2012 | Pontier | G06F 17/30554 707/723 |
| 2012/0254143 A1 | 10/2012 | Varma et al. | |
| 2013/0018864 A1 | 1/2013 | Regan et al. | |
| 2013/0018867 A1 | 1/2013 | Regan et al. | |
| 2014/0372413 A1 * | 12/2014 | Banner | G06F 17/30958 707/722 |

(Continued)

OTHER PUBLICATIONS

Notice of Allowance and Fee(s) Due for U.S. Appl. No. 14/581,228 (dated Mar. 28, 2018).

(Continued)

*Primary Examiner* — Son T Hoang
(74) *Attorney, Agent, or Firm* — Jenkins, Wilson, Taylor & Hunt, P.A.

(57) ABSTRACT

One method includes receiving aggregated free-form query information comprising a first section and a second section for requesting data pertaining to a computing system and converting the first section and the second section of the aggregated free-form query information into an original query portion and a contingency query portion for accessing at least one data set. The method further includes accessing, using the original query portion, the at least one data set to obtain result information pertaining to an initial element included in the computing system. The method also includes accessing, using the contingency query portion and the result information returned in response to the original query portion, the at least one data set to obtain information for at least one descendant element or ancestor element related to the initial element included in the result information.

17 Claims, 7 Drawing Sheets

(56) References Cited

U.S. PATENT DOCUMENTS

| | | | |
|---|---|---|---|
| 2015/0142704 A1 | 5/2015 | London | |
| 2016/0004696 A1 | 1/2016 | Trenkov et al. | |
| 2017/0249309 A1* | 8/2017 | Sarikaya | G06N 5/02 |
| 2018/0081937 A1* | 3/2018 | Broecheler | G06F 17/30312 |
| 2018/0349455 A1 | 12/2018 | Nandyalam et al. | |

OTHER PUBLICATIONS

Advisory Action Before the Filing of an Appeal Brief for U.S. Appl. No. 14/581,228 (dated Aug. 21, 2017).

Final Office Action for U.S. Appl. No. 14/581,228 (dated Jun. 13, 2017).

Non-Final Office Action for U.S. Appl. No. 14/581,228 (dated Feb. 23, 2017).

Titan: Distributed Graph Database, http://thinkaurelius.github.io/titan/, pp. 1-2 (Dec. 17, 2014).

"Graph Database," Wikipedia, http://en.wikipedia.org/w/index.php?title=Graph_database&oldid=638548725, pp. 1-10 (Dec. 17, 2014, Downloaded from the Internet Dec. 23, 2014).

"Elasticsearch," Wikipedia, http://en.wikipedia.org/w/index.php?title=Elasticsearch&oldid=635606114, pp. 1-4 (Nov. 27, 2014, Downloaded from the Internet Dec. 23, 2014).

"ANTLR," Wikipedia, http://en.wikipedia.org/w/index.php?title=ANTLR&oldid=635516124, pp. 1-4 (Nov. 26, 2014, Downloaded from the Internet Dec. 23, 2014).

"Overview," http://www.elasticsearch.org/overview, pp. 1-6 (Copyright 2014).

"Open Source Distributed Real Time Search & Analytics," http://www.elasticsearch.org/, pp. 1-6 (Copyright 2014).

"What is ANTLR?," ANTLR, http://www.antlr.org/index.html, pp. 1-2 (Copyright 2014).

"About The ANTLR Parser Generator," ANTLR, http://www.antlr.org/about.html, p. 1 (Copyright 2014).

Non-Final Office Action for U.S. Appl. No. 14/581,228 (dated Oct. 20, 2017).

Commonly-assigned, co-pending U.S. Appl. No. 16/038,408 for "Methods, Systems, and Computer Readable Mediums for Performing a Free-Form Query," (Unpublished, filed Jul. 18, 2018).

Commonly-assigned, co-pending U.S. Appl. No. 16/890,599 for "Methods, Systems, and Computer Readable Mediums for Performing an Aggregated Free-Form Query," (Unpublished, filed Jun. 2, 2020).

Non-Final Office Action for U.S. Appl. No. 16/038,408 (dated Apr. 16, 2020).

* cited by examiner

CIS QUERY ENGINE – QUERY PAGE

202 — *find CIS Host OSs related to hostcluster uid = 4576*   SEARCH — 204

Found 3, showing 0 to 3, show *next, previous, first few*

206

| ELEMENT TAG | CIS HOST OS NAME | CIS TAG | HOST | STATUS | CLUSTER ID |
|---|---|---|---|---|---|
| CIS Host OS | HAL634 | CIS-2432 | T34.test.lab | Normal | C-4576 |
| CIS Host OS | HAL648 | CIS-2502 | T44.test.lab | Normal | C-4576 |
| CIS Host OS | HAL667 | CIS-2545 | T35.test.lab | CRITICAL | C-4576 |
| | | | | | |
| | | | | | |

FIG. 2

CIS QUERY ENGINE – QUERY PAGE

*Find CIS Host OSs related to hostcluster uid "4576" then related virtual machine*  — SEARCH Found 32, showing 0 to 32, show <u>next</u>, *previous*, *first few*

| ELEMENT TAG | CIS HOST OS NAME | CIS TAG | VM ID | VM STATUS | CLUSTER ID |
|---|---|---|---|---|---|
| VM | HAL634 | CIS-2432 | VDX-4334 | OPERABLE | C-4576 |
| VM | HAL634 | CIS-2432 | VDX-4361 | OPERABLE | C-4576 |
| VM | HAL634 | CIS-2432 | VDX-4457 | OPERABLE | C-4576 |
| VM | HAL648 | CIS-2502 | VDM-4164 | OPERABLE | C-4576 |
| VM | HAL648 | CIS-2502 | VDM-4465 | OPERABLE | C-4576 |

METHODS, SYSTEMS, AND COMPUTER READABLE MEDIUMS FOR PERFORMING AN AGGREGATED FREE-FORM QUERY

TECHNICAL FIELD

The subject matter described herein relates to query engines. More specifically, the subject matter relates to methods, systems, and computer readable mediums for performing an aggregated free-form query.

BACKGROUND

Management software can include user interfaces (UIs) and/or graphical user interfaces (GUIs) for managing, monitoring, viewing, and/or configuring one or more components (e.g., physical resources and/or virtual resources) within or associated with a computing system, e.g., a backend computing system separate from the management software. Such management software can include search functionality that allows a user to search for a specific element or entity in the computing system using specific criteria. In many cases however a search regarding a particular system element is unable to return results that pertain to other elements related to the originally requested system element data. To acquire this related data in such instances, a system's search functionality can require the inefficient generation of entirely new queries that must independently originate from the requesting client application.

SUMMARY

Methods, systems, and computer readable mediums for performing an aggregated free-form query are disclosed. According to one exemplary embodiment, a method includes receiving aggregated free-form query information comprising a first section and a second section for requesting data pertaining to a computing system and converting the first section and the second section of the aggregated free-form query information into an original query portion and a contingency query portion for accessing at least one data set. The method further includes accessing, using the original query portion, the at least one data set to obtain result information pertaining to an initial element included in the computing system. The method also includes accessing, using the contingency query portion and the result information returned in response to the original query portion, the at least one data set to obtain information for at least one descendant element or ancestor element related to the initial element included in the result information.

BRIEF DESCRIPTION OF THE DRAWINGS

The subject matter described herein will now be explained with reference to the accompanying drawings of which:

FIG. 2 is a block diagram illustrating an exemplary user interface for performing a free-form query;

FIG. 3 is a block diagram illustrating an exemplary user interface for performing an aggregated free-form query according to an embodiment of the subject matter described herein;

DETAILED DESCRIPTION

Figure 1:
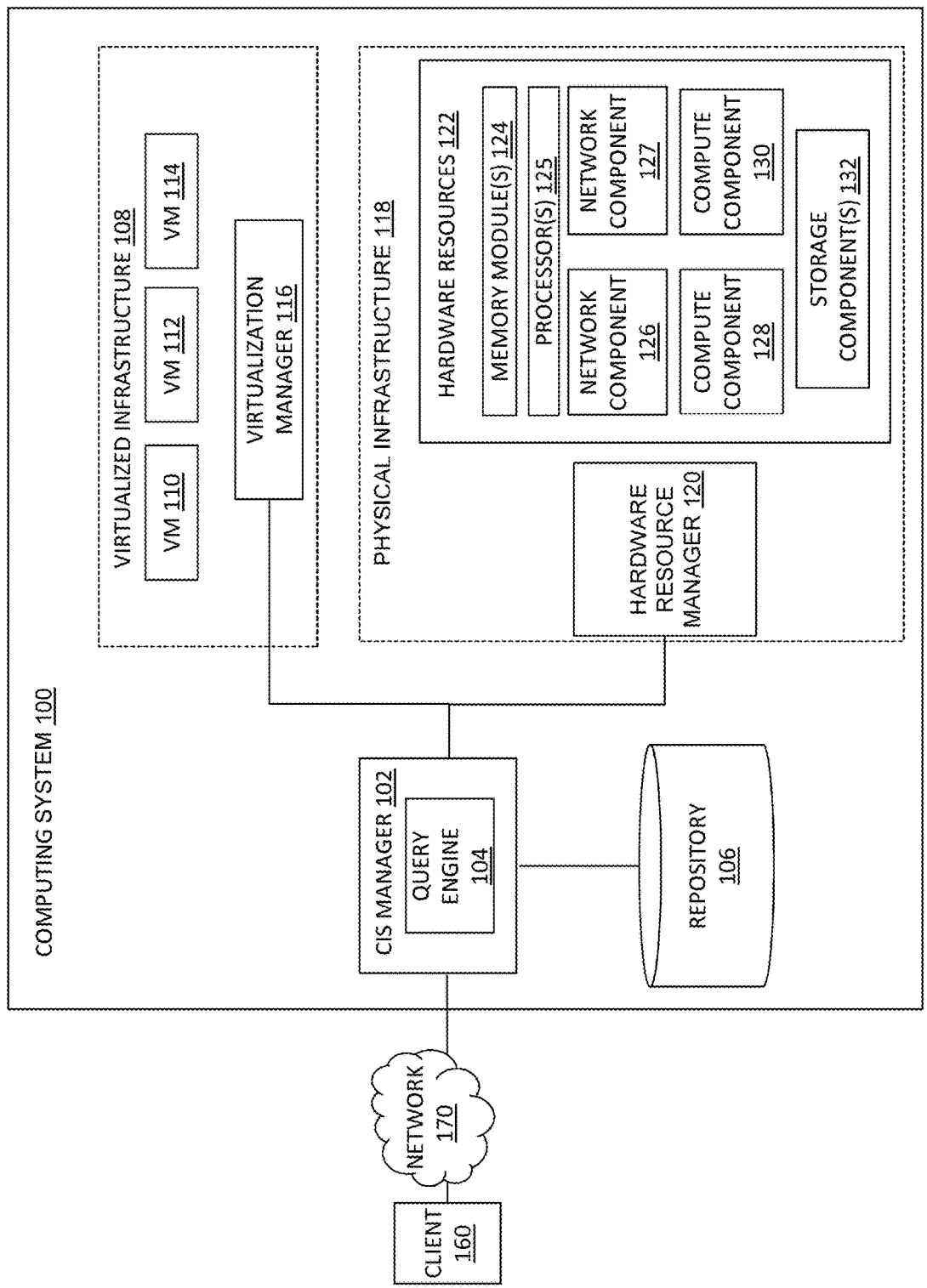
FIG. 1 is a block diagram illustrating an exemplary converged infrastructure system according to an embodiment of the subject matter described herein.

The subject matter described herein includes methods, systems, and computer readable mediums for performing an aggregated free-form query. In some computing systems, the management software utilized can include a search tool for discovering a specific computing system element, such as a component, a physical resource, and/or a virtual resource included in a computing system or group of computing systems. However, such search tools generally require specific inputs (e.g., specific commands, instructions, criteria, related identifiers, etc.) that can require significant amounts of domain knowledge, experience, and/or research by a user to perform adequate searching. Further, such adequate searching typically requires a plurality of separate searches depending on the architecture and/or type of database being referenced. As such, the disclosed subject matter addresses these issues by providing an extension to a natural language free-form query that enables a user (via a query engine) to perform complex and cumbersome multi-query processes using a single aggregated free-form query. The manner in which this extension may be implemented is described below in greater detail.

In accordance with some aspects of the disclosed subject matter, a computing platform (e.g., a system or device) or module (e.g., firmware, hardware, and/or software executing on a processor) can include functionality for performing an aggregated free-form query involving one or more data sets. For example, data sets can include various data structures, e.g., a management information base (MIB), a graph database, a data store, a relational database, and/or other databases, managed by one or more data management systems. In this example, a query engine in accordance with aspects of the disclosed subject matter can analyze and/or convert the free-form query into one or more appropriate query formats for querying relevant data sets.

In accordance with some aspects of the disclosed subject matter, functionality for performing an aggregated free-form query can provide relevant query results in a prompt manner, e.g., at or near real-time. For example, a query engine in accordance with aspects of the disclosed subject matter can be configured to quickly and efficiently query relevant data sets and to obtain and/or derive related information (e.g., contextually relevant) associated with the aggregated free-form query. In this example, the related information to be searched can be stored in a graph database and may be determined by identifying relationships between two or more data elements in the graph database.

Further, by providing real-time or near real-time results that include contextually relevant information, some aspects of the disclosed subject matter can provide relevant information associated with a query that increases user productivity and/or efficiency. For example, rather than simply providing results that solely includes queried information, a query engine in accordance with aspects of the disclosed subject matter can be configured to obtain and/or identify elements that are related to the result from an initial find provided in an aggregated free-form query. For example, the query engine may be configured to retrieve the virtual machines (VMs) that are hosted in a particular host cluster. Since VMs do not directly descend from a host cluster in a graph database, typical natural language freeform queries are not configured to permit a user to obtain this type of host cluster dependent information easily.

In accordance with some aspects of the disclosed subject matter, functionality for performing an aggregated free-form query can involve interacting with one or more computing systems. In some embodiments, the computing systems may include converged infrastructure systems (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although the following disclosure describes performing an aggregated free-form query in the context of one or more CISs, any computing system or integrated infrastructure system can be utilized without departing from the scope of the present subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computing system can be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, CIS 100 can be configured to provide data management functionality, cloud service functionality, and/or other functionality. CIS 100 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CIS 100, CSCs therein, and/or other entities. In some embodiments, client 160 can communicate directly with CIS 100 with or without using network 170. As shown below, client 160 may include any device that is configured to receive aggregated free-form query information (e.g., via a supported web browser user interface) and subsequently forward such query information to a query engine and/or management element in CIS 100 (e.g., via a REST API).

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 may be further configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision® Intelligent Operations software and/or firmware.

In some embodiments, CIS manager 102 can include a converged infrastructure management application for interacting with CIS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for inputting information for performing an aggregated free-form query and/or for displaying query results associated with the free-form query.

CIS manager 102 can comprise or interact with a query engine 104. Query engine 104 can be any suitable entity (e.g., hardware, firmware, and/or software executing on a processor) for executing one or more aspects associated with performing an aggregated free-form query. For example, query engine 104 can be configured to receive input (e.g., aggregated free-form query information in the form of a natural language query or command) from a user (via client 160) requesting information about CIS or a CSC therein. Notably, query engine 104 may be configured to convert or transform the user input into an aggregated query including an original query portion and a contingency query portion. Query engine 104 may subsequently use each of the original query portion and the contingency query portion to access a data structure (e.g., at least one data set). Notably, results associated with the aggregated freeform query may be provided and/or presented by query engine 104 to the user.

In some embodiments, query engine 104 can include functionality for receiving, analyzing, and/or processing aggregated free-form (e.g., natural language and/or semi-natural language with multiple clauses) queries. For example, if a user (e.g., at client 160) is attempting to determine the VMs that are hosted by a particular host cluster (comprising a plurality of VM host machines), query engine 104 may process an aggregated free-form query to determine such information. Continuing with the example, query engine 104 can use the aggregated free-form query to provide results specified in a contingency query clause, wherein such results provided are based on the information returned in response to an original query clause associated with the aggregated free-form query.

In some embodiments, query engine 104 can include functionality for processing aggregated free-form query information and for interpreting information in the aggregated free-form query information so as to identify information usable for generating non-free-form (e.g., machine understandable) queries. For example, query engine 104 can include a processing engine (e.g., a parser, a grammar-driven analyzer, and/or software, like ANother Tool for Language Recognition (ANTLR), executing on a processor) for performing grammar processing associated with an aggregated free-form query. In this example, query engine 104 can process the aggregated free-form query information by performing a lexical and/or structural (e.g., syntactical) interpretation such that the interpretation becomes unambiguous, yet tolerant of natural language sentence structure, e.g., by accepting, yet disregarding or ignoring, certain words, such as "the", "with", "for", etc.

In some embodiments, query engine 104 or an entity therein can generate an abstract syntax tree (AST), also referred to herein as a phrasing tree, associated with an aggregated free-form query. An example of such a phrasing or syntax tree is described below with respect to FIG. 6. In some embodiments, aggregated free-form query (e.g., a natural language query) information can comprise at least a first section and a second section for requesting data pertaining to a computing system. Notably, each of the first section and the second section may include language comprising various combinations of analytical, geospatial, and/or categorical phrasings (e.g., query related commands, instructions, and/or criteria). In this example, query engine 104 can convert the aggregated free-form query language into a phrasing tree that stands independent of any particular grammar specification, data set, or data management system. Continuing with this example, query engine 104 can use the phrasing tree for generating non-free-form (e.g., machine-readable or machine-actionable) queries, such as a structured query language (SQL) query, a NoSQL query, an extensible markup language (XML)-based query, a proprietary query, a Titan-based query, or another query, usable for interacting with one or more data management systems and/or for querying one or more data sets.

In some embodiments, query engine 104 or an entity therein can generate an original query portion and a contingency query portion that are associated with the different sections included in the aggregated free-form query language. For example, query engine 104 can be configured to generate, using a phrasing tree, query portions that are compatible with one or more data management systems and/or data sets and can use the generated query portions for obtaining query results and/or related information. In some examples, query engine 104 can be configured to generate an original query portion based on an original clause (e.g., a first section) of the aggregated free-form query. Similarly, query engine 104 can generate a contingency query portion based on an appended contingency clause (e.g., a second section) of the aggregated free-form query. Additional detail regarding the capabilities of query engine 104 is described below.

In some embodiments, query engine 104 can include functionality for performing query processing and/or analyses associated with a syntax tree. For example, after generating a syntax tree associated with aggregated free-form query information, query engine 104 can perform a query analysis for determining what type and how many query portions are needed for responding to (e.g., answering) an aggregated free-form query. For example, query engine 104 may be configured to generate a contingency query portion upon detecting either a "then related" clause or a "then only related" clause in the aggregated free-form query information being processed.

In some embodiments, query engine 104 can include functionality for querying, traversing, and/or utilizing a graph related data structure (e.g., a Titan distributed graph database). For example, query engine 104 can include a processing engine (e.g., a graph data set management system and/or graph database software executing on a processor) for receiving a query or other information and using the information to query a graph related data structure, such as data elements stored in a graph database, for obtaining and/or deriving relevant query results.

In some embodiments, a graph related data structure, such as a graph database, can include data elements (e.g., represented as nodes and/or vertices), edges, and properties for representing and/or storing data. In this example, each data element can represent a CSC, a computing system, CIS 100, virtual machines, host clusters, or other entities and can include associated properties or attributes. Continuing with this example, relationships between the data elements can be represented as connections or edges connecting the data elements. Such a graph database is described below and in FIG. 4 in greater detail.

In some embodiments, a query can be constructed or generated for obtaining or identifying relationships between data, data sets, or data objects. For example, query engine 104 can identify relationships between portions of free-form information and can use this information in generating a relational query and/or for traversing data elements and edges in a graph database. In this example, after identifying relevant relationships, a relational query can use the relationships and/or additional information for obtaining relevant information associated with the free-form query information.

In some embodiments, query engine 104 can find, determine, and/or provide one or more computing systems, CISs, CSCs, and/or hosted virtual machines therein that meet query criteria and, optionally, can rate and/or rank the computing systems, CISs, CSCs and/or hosted virtual machines therein that satisfy either the original query portion or contingency query portion criteria based on one or more factors. For example, a user can trigger query engine 104 to "find CIS Host OSs related to hostcluster uid="4576" then related VirtualMachine" via a user interface. In this example, results obtained by query engine 104 can include a number of virtual machines hosted by the virtual host operating systems in the specified host cluster and/or related system identifiers that meet the requested criteria.

In some embodiments, query related information can be stored in repository 106. Repository 106 can include any data storage unit (e.g., a database or plurality of databases) that can be configured to store query related information, such as query instructions, query commands, query criteria, phrasing/syntax trees or related data structures, query generation rules, parsing rules, and/or historical information. Although FIG. 1 depicts repository 106 as a local data storage unit residing on CIS 100, repository 106 can also be embodied as a data storage unit located at an online location (e.g., a public distributed content site), on a local proxy server in a user' or system administrator's environment, or on a different CIS without departing from the scope of the disclosed subject matter. Further, repository 106 can be implemented using one or more computing platforms, devices, or systems.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 can be communicatively connected to various other CSCs in CIS 100 and other entities. Hardware resources 122 can be configured for use by one or more virtual entities. In some embodiments, network components 126-127 (e.g., network switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, storage component(s) 132 can include any storage medium or storage unit that is configured to store information accessible by processor(s) 125 via a system bus. In some embodiments, repository 106 or portions thereof can utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, a query engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, query engine 104 can comprise multiple, interacting processing engines, e.g., one engine for UI interaction, one engine for parsing, one engine for unstructured data set retrieval and management, and one engine for graph related data structure retrieval and management. Further, aspects of the disclosed subject matter (e.g., query engine 104) can be implemented and/or located on any computing system or components therein.

FIG. 2 is a block diagram illustrating an exemplary user interface 200 for performing a typical free-form query. In some instances, user interface 200 may be configured for providing, receiving, and/or displaying query related information. For example, user interface 200 can be presented to a user via a web browser executing on a processor at client 160. User interface 200 can also include a query input box 202, a query button 204, and a results container 206. Notably, user interface 200 may include any suitable UI element container or UI window for displaying or providing search query content to a user. Further, user interface 200 can include UI elements for providing query criteria and/or for querying data sets for relevant information. For example, a user can utilize user interface 200 for simply identifying the CIS host operating systems (e.g., the operating systems utilized by CI systems, which are configured to host the virtual machines) related to a host cluster C-4576. An example of such a search query that is entered into query input box 202 may include the text "find CIS Host OSs related to host cluster UID=C-4576." While the system and/or the query engine can typically process such a request, additional queries would be needed for information indirectly related to the original query, such as to determine the virtual machines hosted/supported by the host cluster.

As an example of such an operation, a user (e.g., via client 160) would initially perform a first query to locate the descendant of a particular element. The user would then conduct a separate query to locate elements that are related to each element returned by the original query. Namely, if an operator user ultimately wanted to identify the virtual machines that were supported by a particular host cluster, multiple individual queries originating from client 160 would be required to obtain this information since this information is typically not available without first knowing the CIS host computer operating system hosting the virtual machines (e.g., the "VM host" OS). Thus, a user would first query a data repository and obtain the CIS host OSs that belong to a particular host cluster designated by the operator. Based on the results of this original query (e.g., the identified CIS host OSs associated with a common host cluster), the user/operator would subsequently conduct separate queries for each CIS host OS that was identified in the response to the previous query. In order avoid this need for separate queries originating from a client 160 to obtain the VM information, query engine 104 may be configured to utilize a single aggregated free-form query to obtain the necessary information.

For instance, the text "find CIS host OSs related to host cluster uid=4576" may be submitted via an exemplary free-form query in an attempt to locate all of the CIS host machine operating systems belonging to the host cluster identified as "4576". In response to such a query, the system may provide a table of results including the host machine operating system related to host cluster uid=C-4576 (e.g., see host machine OS HAL634, host machine OS HAL648, and host machine OS HAL667 in results container 206 in FIG. 2). Upon receiving data identifying the aforementioned host machine operating systems included in host cluster C-4576, an operator would subsequently submit a plurality of new queries for identifying the virtual machines supported by each of the identified host machine operating systems in the host cluster. More specifically, the operator would submit a second separate query such as "find virtual machines included in host machine OS=HAL634" in order to identify the virtual machines supported by the particular host machine operating system (e.g., OS HAL634 in host CIS-2432). Further, similar queries would be repeated for each of the remaining identified host machine operating systems (e.g., OS HAL648 in host CIS-2502 and OS HAL667 in host CIS-2545). After identifying the virtual machines supported by each of host operating systems HAL648 and HAL667 via the separate queries from client 160, the system would be able to provide identification information pertaining to the identified virtual machines to the operator. In some embodiments, the identification information may be provided in a text file and/or presented for display on a user screen.

FIG. 3 is a block diagram illustrating an exemplary user interface 300 for performing an aggregated free-form query (as opposed to a plurality of simple free-form queries). In some embodiments, the disclosed subject matter can utilize an aggregated free-form (e.g., plain English) query for querying one or more data sets that includes a graph database (e.g., graph database 400 described below and depicted in FIG. 4). Moreover, some aspects of the disclosed subject matter can allow a user to initiate an aggregated query with a simple (e.g., free-form) phrase that includes multiple clauses and/or sections (e.g., an original clause/section and a contingency clause/section). Such an aggregated query language structure obviates the need for subsequent queries originating from a client 160 that are used to obtain information related to the original clause/phrase by way of triggering a contingent query portion at query engine 104.

In some embodiments, an extension to a natural language query (e.g., a contingency clause included in the aggregated free-form query information) is processed by query engine 104 into a contingency query portion, which enables query engine 104 to locate computing system elements that are related to the elements that are returned and/or found in response to an original query portion based on an original clause of an aggregated free-form query information. More specifically, query engine 104 may be configured to perform a single aggregated free-from query by extending the natural query language included in an original clause to include a contingency clause (i.e., the extension). For example, the contingency clause may include an appended query language portion that comprises a "then related" clause or "then only related" clause. Examples of both an original query portion and contingency query portion are described below.

By appending the contingency clause to the original query language (e.g., the original clause) to formulate the aggregated free-from query information, query engine 104 may ultimately be enabled to traverse a graph database in such a manner that a plurality of query operations may be performed in response to a single aggregated free-form query information submission from a user.

In reference to FIG. 3, query engine 104, CIS manager 102, a converged infrastructure management application, and/or an associated module or node can generate and/or provide user interface 300 for providing, receiving, and/or displaying aggregated query related information. In some embodiments, user interface 300 can be presented to a user via a web browser executing on a processor at client 160.

In some embodiments, user interface 300 may include any suitable UI element container or UI window for displaying or providing search query content to a user. Further, user interface 300 can include UI elements for providing query criteria and/or for querying data sets for relevant information. For example, a user can utilize user interface 300 for identifying VMs supported by and/or related to a host cluster C-4576.

In FIG. 3, user interface 300 can include a query input box 302, a query button 304, and a results container 306. Query input box 302 can represent any suitable UI element for receiving user input. Further, query button 304 can represent any suitable UI element for initiating and/or triggering an aggregated query. For example, after inputting text (e.g., natural language) into query input box 302, a user can select or click query button 304. In this example, in response to selecting query button 304, the text in query input box 302 can be sent to query engine 104 for generating aggregated query portions (e.g., an original query portion and a contingency query portion) and obtaining relevant query results. For example, a user can use query input box 302 to input an aggregated free-form query as a natural language question or command, such as "find CIS host OSs related to host cluster uid C-4576 then related virtual machines", for requesting virtual machine information associated with CIS 100 or any related computing environment. In this example, "find CIS host OSs related to host cluster uid C-4576" is the original clause or base clause, while "then related virtual machines" is the contingency clause (i.e., the extension). In some embodiments, query engine 104 may be configured to execute this query by initially processing the original clause (i.e., the first section) of the aggregated query information. Upon parsing this clause and/or section of the aggregated query information, query engine 104 may derive an original query portion, which is subsequently utilized by query engine 104 to access (e.g., cross-referencing the terms with database entries) a database, such as database 400 in FIG. 4. Query engine 104 may then locate a vertex and/or element corresponding to the host cluster identified by UID="C-4576" (e.g., host cluster vertex 406 in FIG. 4). At this point, query engine 104 would traverse an edge (e.g., arrow 407) to locate the one or more related CIS host OS (e.g., CIS host OS 414 in FIG. 4).

After processing the original query portion, query engine 104 may be configured to utilize the query results that were returned in response to original query portion. Namely, query engine 104 may subsequently execute a contingency query portion based on the appended contingency clause (i.e., the second section) of the aggregated free-form query information. For example, query engine 104 may be configured to utilize the returned results of the original query portion as the basis for the contingency query portion. Notably, this basis would typically be unknown or unavailable without a previous and separate query conducted by an operator.

Results container 306 can represent any suitable UI element for displaying one or more query results and/or results related information. For example, results container 306 can display results in a tabular or grid format, e.g., each result entry can be displayed in a separate row among a set of rows. In this example, requested information and/or related information can be displayed in results container 306. Continuing with the example, if a user selects a result (e.g., a result line or row) in results container 306, additional information can be presented to the user about the selected result. Typically, such results are either directly associated with the queried element or a direct descendant element/vertex and/or ancestor element/vertex from the queried element. As used herein, an ancestor element/vertex may include a vertex in a graph database that is connected to a queried element/vertex (e.g., an initial node/vertex) via an edge that leaves the queried element/vertex (i.e., and directly enters the ancestor element/vertex). In some instances, an ancestor element/vertex may also be an element or vertex that is indirectly connected to the queried element via a chain of "leaving" edges and other intermediate/interconnecting ancestor element/vertices. Similarly, a descendant element/vertex may include a vertex in a graph database that is connected to a queried element via an edge that directly enters the queried element/vertex (i.e., and originates directly from the descendant element/vertex). In some instances, a descendant element/vertex may also be an element or vertex that is indirectly connected to the queried element via a chain of "entering" edges and other intermediate/interconnected descendant element/vertices. In some embodiments, results container 306 may include results that include information pertaining to the contingency clause. For example, results container 306 may list the virtual machines supported by each of the CIS operating systems in the host cluster identified by UID=C-4576.

In some embodiments, results or results-related information in results container 306 can be sorted based on one or more factors. For example, results in results container 306 can be listed alphabetically, temporally (e.g., by an active date), and/or based on usage (e.g., results can be listed from most frequently selected to least frequently selected) or status (e.g., active VMs followed by inactive VMs), or association with a particular grouping (e.g., common CIS host cluster identifier).

It will be appreciated that FIG. 3 is for illustrative purposes and that additional and/or different UI elements than those depicted in FIG. 3 can be usable for displaying and/or providing information associated with an aggregated free-form query.

Figure 4:
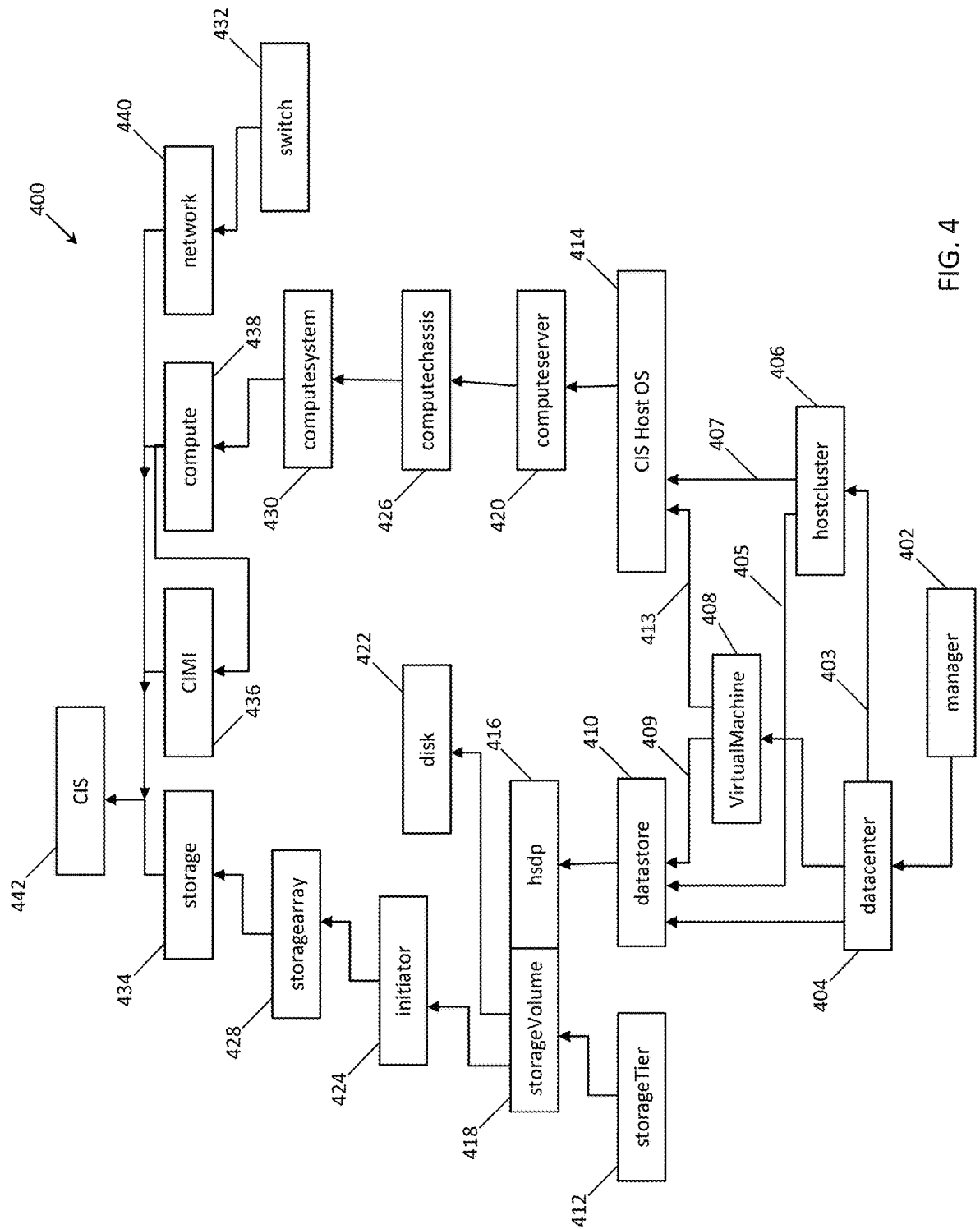
FIG. 4 is a flow diagram illustrating the relationships among elements of an exemplary graph data structure according to an embodiment of the subject matter described herein.

FIG. 4 is a flow diagram illustrating the relationships among elements of an exemplary graph data structure according to an embodiment of the subject matter described herein. As indicated above with respect to FIG. 3, a UI 300 may be utilized to provide aggregated free-form query language to query engine 104, which in turn generates a plurality of query portions (e.g., an original query portion and a contingency query portion) that are used to access graph database 400 via an enhanced traversal algorithm that is configured to reset upon detection a received contingency clause (e.g., "then related" or "then only related" clause). As used herein in the context of a graph database (e.g., graph database 400), the terms element, vertex, and node may be used interchangeably in some instances.

Typically, query engine 104 may be configured to execute a traversal algorithm that systematically searches a graph database. For example, query engine 104 may begin the traversal search at an initial vertex (or node) identified by the initial query. Query engine 104 then initiates the graph traversal by finding incoming and outgoing edges and traverses each edge (e.g., identified as an "edge zero" by query engine 104) to visit an adjacent vertex. As used herein, an "edge zero" is defined as any outgoing edge or incoming edge that is respectively leaving or entering the designated initial vertex/node in a graph database. Query engine 104 subsequently determines whether the vertex is the target element type. Notably, query engine 104 continues this process until a terminal point of traversal is reached, whereupon the process is repeated for each edge with the same directionality of edge zero. With respect to performing an aggregated query, however, query engine 104 may be configured to initiate the traversal search at an initial node. As before, query engine 104 then initiates the graph traversal by finding incoming and outgoing edges and traverses each edge (identified as edge zero) to visit an adjacent vertex. As before, query engine 104 continues this process until a terminal point of traversal is reached (e.g., when the element(s) satisfying the original clause portion is/are located by query engine 104), whereupon the process is repeated for each edge with the same directionality of edge zero. Upon processing the contingency clause of the aggregated free-form query, query engine 104 triggers a reset algorithm, which re-designates the current vertex as a new "initial" vertex. In response, both the outgoing edges and the incoming edges of this current vertex are re-defined as edge zero. Continuing from this point, the traversal algorithm executed by query engine 104 proceeds as before considering only those edges with the same directionality as edge zero.

In some embodiments, query engine 104 may be configured to apply the query language submitted/indicated in query input box 302 (as shown in FIG. 3). Specifically, the submitted query language includes "find CIS host OSs related to host cluster uid C-4576 then related virtual machines". Referring to graph database 400 in FIG. 4 as an example, an aggregated query conducted by query engine 104 would start at a vertex/node representative of a host cluster (e.g., vertex 406 in FIG. 4) since the term "host cluster" is specified in the original clause of the submitted query language. At this stage, all edges associated with vertex 406 are designated as an "edge zero" are determined by query engine 104. For example, query engine 104 would designate each of edge 407 (i.e., the edge leaving vertex 406 out to vertex 414), edge 405 (i.e., edge leaving vertex 406 out to vertex 410), and edge 403 (i.e., the edge entering vertex 406 in from vertex 404) as an edge zero. In this scenario, only the first edge, i.e., edge 407, returns a result that successfully satisfies the contingency clause when following its directionality of "out to". Notably, edge 407 returns a successful result because it leads to an ancestor vertex (i.e., vertex 414) associated with CI Host OSs, which is specified in the original clause of the submitted query. Consequently, upon reaching vertex 414 (and identifying the requested CI Host OSs), the contingency clause is reached and a reset algorithm is utilized by query engine 104. In some embodiments, the reset algorithm includes an algorithm that is triggered by the detection of the contingency clause by query engine 104, which in turn resets the traversal algorithm. Upon the resetting of the traversal algorithm, a new initial element (e.g., a new origin vertex) is designated by query engine 104 from which the traversal algorithm will restart. Consequently, resetting the traversal algorithm establishes new edge zeroes from the new initial element. For example, in response to resetting the traversal algorithm, vertex 414 is subsequently designated by query engine 104 as the new initial vertex/node (e.g., a new origin vertex) and each of the immediate edges entering/leaving vertex 414 is designated as an "edge zero". For example, query engine 104 may be configured, using vertex 414 as an initial vertex, to designate the each of edge 413 (i.e., the edge entering vertex 414 in from vertex 408), edge 415 (i.e., the edge leaving vertex 414 out to vertex 420), and edge 407 (i.e., the edge entering vertex 414 in from vertex 406) as an edge zero. In this scenario, only the edge 413 results in successfully satisfying the contingency clause when following its directionality of "in from" and vertex 408 is then identified by query engine 104 as the terminal point (as well as a descendant vertex). More specifically, edge 413 returns a successful result because it leads to a descendant vertex (i.e., vertex 408) associated with virtual machines, which is specified in the contingency clause of the submitted query.

As described above, the disclosed subject matter enables a query engine 104 to process the original query portion and a contingency query portion that is based on an extension included in the aggregated free-form query language. Notably, the contingency query portion will enable a query engine to perform the aforementioned complex and cumbersome multi-stage query process in a single aggregated free-form query (i.e., without separate and multiple queries for originating from that user and/or client 160). More specifically, without the use of an aggregated free-form query, multiple queries originating from a client (e.g., client 160 in FIG. 1) may be required to obtain information pertaining to a node's descendants and/or ancestors because of i) the current constraints of the natural language query syntax and ii) the manner in which elements are related to each other in a graph database structure. For example, a graph database may be configured to store a system elements and a representation of their respective relationships with the other elements. For instance, FIG. 4 illustrates an example graph database that includes elements of a computing system and a representation of how the computing system elements are related to each other. In particular, system elements (e.g., each of which is represented as graph vertex and/or node) are connected to their adjacent neighbors (e.g., direct descendant and/or ancestor vertices), via a graph edge (e.g., depicted in FIG. 4 as a connecting line). Such a graph database structure does not permit the use of edges to represent the direct relationship between a system element and its indirect (e.g., non-adjacent) descendant and/or ancestor vertices. Typically, a query engine that receives a natural language query is unable to identify the virtual machines (e.g., virtual machine entry vertex 408) related to and/or supported by the particular host cluster (e.g., host cluster 406) via a single query. More specifically, since virtual machine vertex 408 is not directly descended (e.g., not connected via an edge) from the host cluster vertex 406, the natural language does not currently provide a way to identify the virtual machines without the use of additional separate natural language queries.

Although only single elements are depicted by the nodes/vertices in FIG. 4, additional components may be similarly represented by a single node without departing from the scope of the disclosed subject matter. For example, there is not necessarily a 1:1 relationship between the nodes depicted in FIG. 4, but rather a 1:X or an X:Y relationship may exist (i.e., wherein each of X and Y is a numeric value equal to two or more).

Figure 5:
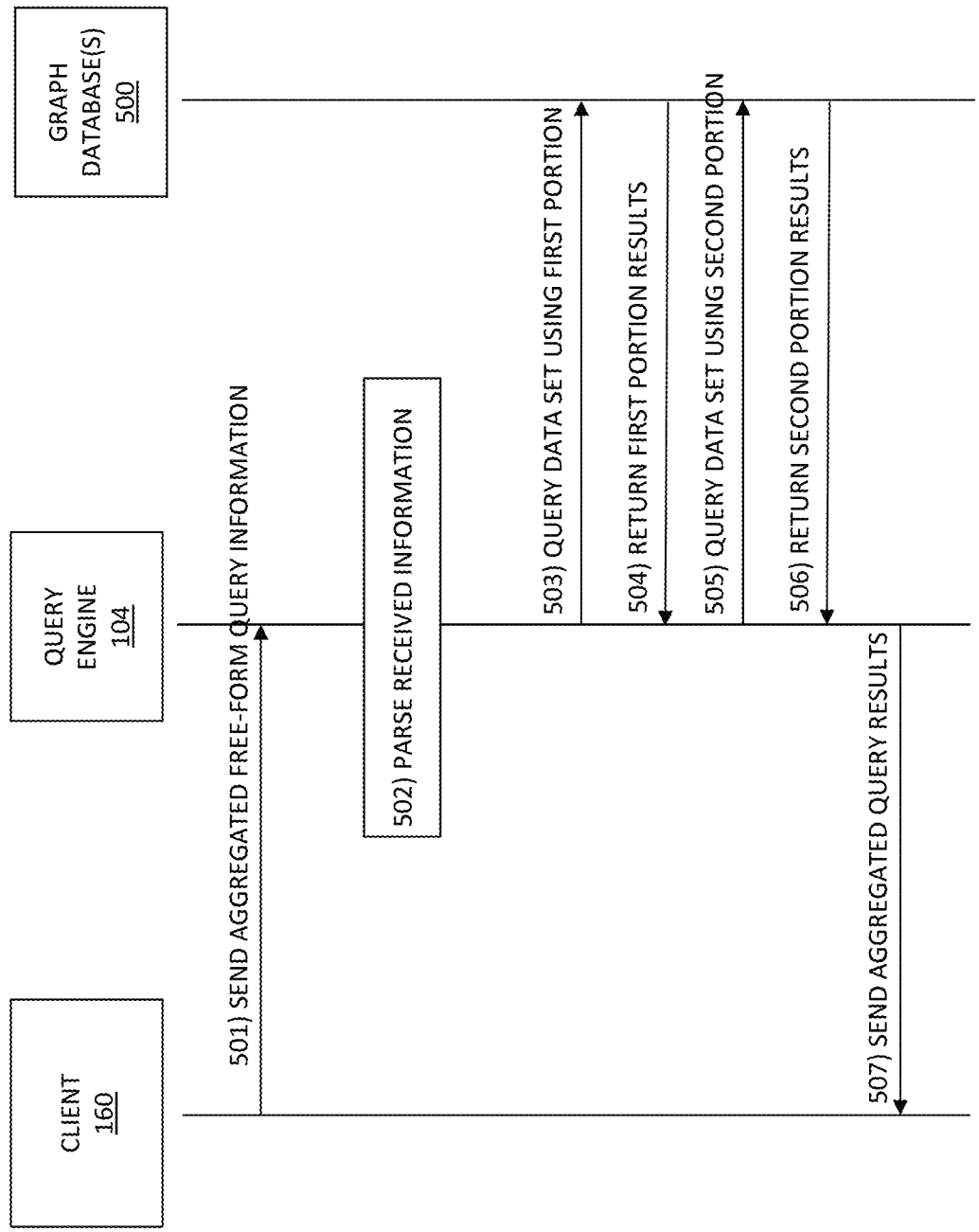
FIG. 5 is a diagram illustrating exemplary communications associated with performing an aggregated free-form query according to an embodiment of the subject matter described herein.

FIG. 5 is a diagram illustrating exemplary communications associated with performing an aggregated free-form query according to an embodiment of the subject matter described herein. In some embodiments, query engine 104 can be integrated with and/or located at CIS manager 102, e.g., server-side software stored in memory and executing on a processor at CIS 100. In other embodiments, query engine 104 can be integrated with and/or located at client 160, e.g., client-side software executing on a processor at client 160.

Referring to FIG. 5, at step 501, aggregated free-form query information may be sent from client 160 to query engine 104. For example, a user can input aggregated free-form query information (e.g., natural language text) in query input box 202 of user interface 200 and select query button 204. Notably, the aggregated free-form query information input may include a first section (e.g., an original clause section) and a second section (e.g., a contingency clause section), both of which request data pertaining to a computing system. In this example, user interface 200 and/or a related application or entity can send the aggregated free-form query information to query engine 104 via an HTTP message or other message.

Figure 6:
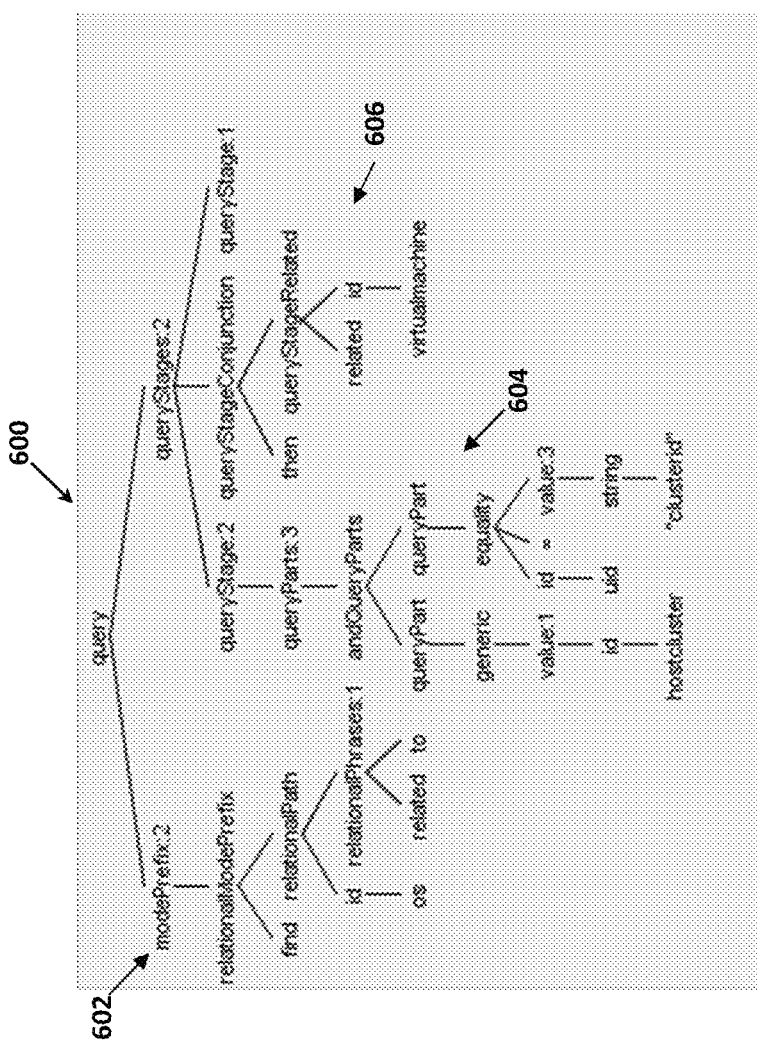
FIG. 6 is a diagram illustrating a syntax tree representative of a parsed aggregated free-form query according to an embodiment of the subject matter described herein.

At step 502, the received aggregated free-form query information can be parsed and/or analyzed. For example, a grammar parser or syntax parser (e.g., software executing on a processor) in query engine 104 can analyze the query information and generate a data structure (e.g., a phrasing tree or syntax tree) that stores a representation of an aggregated free-form query based on a conversion of the received aggregated free-form query information. In some examples, the parser and/or query engine 104 can use a syntax tree to generate compatible queries for each of the first and second sections of the aggregated free-from query information used to access the one or more data sets. An exemplary syntax tree 600 is depicted in FIG. 6. Notably, syntax tree 600 includes three sections or stages which have be constructed via grammar processing performed by the parser (not shown) and/or query engine 104. For example, the original clause portion (i.e., a first section) of the aggregated query information may comprise one or more stages 602 and 604, while the contingency clause portion is represented by stage 606 (e.g., "queryStageConjunction") in syntax tree 600.

At step 503, one or more data sets, such as one or more graph databases 500, can be queried using an original query portion of an aggregated free-form query that is converted from the aggregated free-form information. For example, after generating a syntax tree, query engine 104 may be configured to generate a graph database query (e.g., a Titan database query) using the different sections or stages of the syntax tree. For example, a graph database 500 can be accessed by query engine 104 sending an original compatible query portion, which is converted from the first section of aggregated free-form information. In this example, query engine 104 can use the original query portion for obtaining information stored in a graph-based data structure. In particular, query engine 104 can access a graph database for identifying a first data element (e.g., a vertex) included in the original query portion of the aggregated free-form query information. In some examples, query engine 104 can use data (e.g., a specified host cluster) included in the original query portion to locate a corresponding vertex (e.g., "host cluster" vertex 406 in FIG. 4) in the graph database that corresponds to element and/or component information designated in the first portion of the aggregated free-form query.

At step 504, result data pertaining to the original query portion of the aggregated free-form query is obtained from graph database(s) 500 by query engine 104. In particular, query engine 104 receives result information that is returned from graph database 500 in response to the original query portion.

At step 505, the one or more graph databases 500 are queried using i) the result information returned in response to the original query portion (i.e., data returned in step 504) and ii) the contingency query portion. In some embodiments, query engine 104 may be configured to send a contingency query portion to graph database 500. Notably, the contingency query portion and the information returned in response to the original query portion (e.g., querying conducted in step 503) are used to formulate the actual subsequent query of graph database(s) 500.

At step 506, data pertaining to the contingency query portion of the aggregated free-form query is obtained from graph database 500 by query engine 104. In particular, query engine 104 receives result information that is returned in response to the contingency query portion (i.e., from step 505).

At step 507, the aggregated query results can be sent by query engine 104 to client 160. In some embodiments, query engine 104 is configured to provide the results returned in response to the contingency query portion to client 160 if the contingency clause comprised a "then only related" clause. Alternatively, query engine 104 may be configured to provide results returned in response to both the original query portion and contingency query portion to client 160 if the contingency clause comprised a "then related" clause. Further, query results can be provided by query engine 104 via an HTTP message or other message and can be displayed using user interface 200 and/or a web browser application.

It will be appreciated that FIG. 5 is for illustrative purposes and that additional and/or different steps than those depicted in FIG. 5 can be usable for performing an aggregated free-form query.

Figure 7:
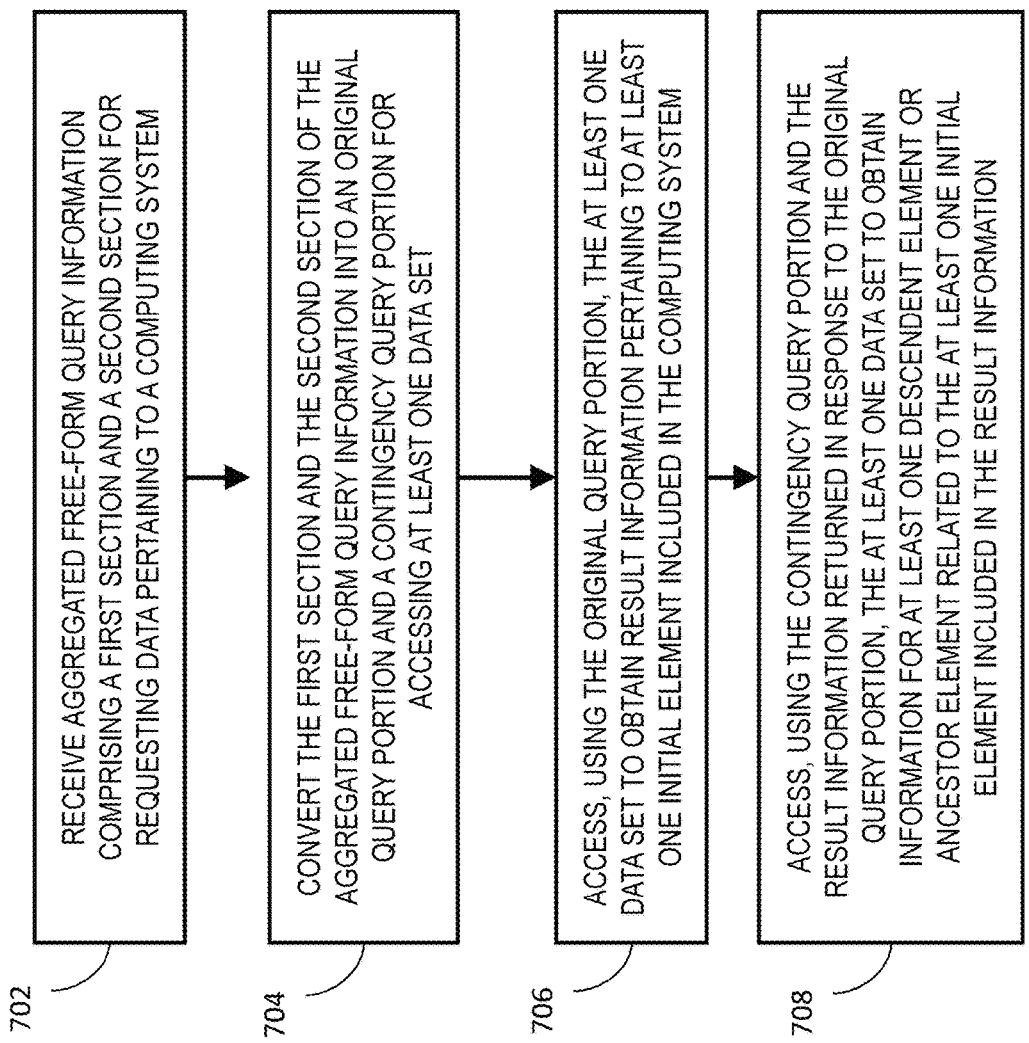
FIG. 7 is a diagram illustrating an exemplary method for performing an aggregated free-form query according to an embodiment of the subject matter described herein.

FIG. 7 is a diagram illustrating an exemplary method 700 for performing an aggregated free-form query according to an embodiment of the subject matter described herein. In some embodiments, exemplary method 700 and/or steps therein can be performed by CIS 100, query engine 104, and/or another node (e.g., a computing platform containing one or more processors and memory) or module. For illustrative purposes and explanation, references to entities included in FIGS. 1 and 2 can be used below.

At step 702, aggregated free-form query information including a first section and a second section for requesting data pertaining to a computing system is received. For example, the aggregated free-form query information may be a single, self-standing query string and/or may be stored in a query message. In another example, free-form information may be stored as in an XML file or other file. In some embodiments, the first section and second section of the aggregated free-form information may include a natural language or semi-natural language query.

At step 704, the first section and the second section of the aggregated free-form query information is respectively converted into an original query portion and a contingency query portion for accessing at least one data set. For example, query engine 104 can convert each section of the aggregated free-form query information (e.g., a natural language command) into a compatible (e.g., a data set native) query message (e.g., an XML-based query, a SQL query, a Titan based query) for accessing a database or other data structure.

In some embodiments, converting a section of aggregated free-form query information into an original query portion or contingency query portion can initially include generating (e.g., using a parser or query engine 104) a data structure (e.g., an AST, a phrasing tree, a syntax tree, etc.) for representing the aggregated free-form query information. The data structure may then be used by query engine 104 and each of the original query portion and contingency portion that is understandable by a data management system managing at least one data set.

In some embodiments, query engine 104 or a related entity (e.g., a parser) can generate a compatible query (e.g., an SQL query, a Titan based query) using a phrasing tree and one or more query generation rules associated with the at least one data set.

At step 706, the original query portion is used to access the at least one data set to obtain result information pertaining to an initial element (e.g., an origin vertex or starting vertex) included in the computing system. For example, query engine 104 can access a management information base (MIB) associated with one or more CSCs in CIS 100 via the original query portion, which has been converted or formatted to be compatible with querying the MIB.

In some embodiments, the original query portion may be used by query engine 104 to access a graph related data structure (e.g., a graph database) for obtaining information about an initial element included in the CIS (or any other designated computing system). The original query portion may also return contextually relevant information that is directly associated with the information about the CIS.

In some embodiments, the at least one data set and a graph related data structure can be associated with one or more data management systems. For example, an element management system (EMS) can manage a database for one or more CSCs associated with CIS 100 and CIS manager 102 can manage a graph related data structure (e.g., a graph database) and one or more data sets containing information about CIS 100 or CSCs therein.

At step 708, the contingency query portion and the result information returned in response to the original query portion is used to access the at least one data set to obtain information for at least one descendant element related to the initial element included in the result information. In some embodiments, query engine 104 may be configured to utilize the data returned from the data set in response to the original query portion. In particular, the returned data may be used with the contingency query portion to formulate a message to access the data set. After receiving the results from both the original query portion and the contingency query portion, query engine 104 may be configured to provide and/or present the returned information pertaining to the computing system. For example, results in the form of a table or grid can be provided in a results container of a user interface (e.g., results container 206 of user interface 200) that is accessible to a client (e.g., client 160).

It should be noted that query engine 104 and/or functionality described herein can constitute a special purpose computing system. Further, query engine 104 and/or functionality described herein can improve the technological field of query engines (e.g., query engines involving diverse data sets managed by multiple entities) by allowing free-form (e.g., natural language) queries for obtaining information about one or more computing systems, CISs, and/or CSCs therein.

In some embodiments, query engine 104 and/or functionality described herein can improve the functionality of UI-assisted queries, UI navigation, and UIs in general by providing relevant and/or contextually aware information associated with a query, thereby providing more efficient and useful query results and minimizing redundant and/or additional queries. It should also be noted that a computing platform that implements the subject matter described herein can comprise a special purpose computing device usable to perform a free-form query for obtaining information about one or more computing systems, CISs, and/or CSCs therein.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing a single natural language query, the method comprising:
   receiving the single natural language query that includes aggregated free-form query information comprising a first section and a second section for requesting data pertaining to computer system elements of a computing system, wherein the second section is appended to the first section via a contingency clause, wherein the computer system elements comprise a plurality of physical resources and/or virtualized resources that are included in the computing system, wherein the aggregated free-form query information is represented as a syntax tree;
   converting, using the syntax tree, the first section of the aggregated free-form query information into an original query portion, and the second section of the aggregated free-form query information into a contingency query portion for accessing at least one data set;
   accessing, using the original query portion, the at least one data set to obtain result information pertaining to an initial computer system element included in the computing system; and
   in response to detecting the contingency clause, using the contingency query portion and the result information returned in response to the original query portion to access the at least one data set to obtain computer system element information as specified in the single natural language query by the contingency clause for at least one descendant element or ancestor element related to the initial computer system element included in the result information, wherein the initial computer system element and each of the at least one descendant element or ancestor element are separate elements of the syntax tree.

2. The method of claim 1, wherein the first section includes an original clause of the aggregated free-form query information and the second section includes a contingency clause that is appended to the original clause.

3. The method of claim 1, wherein the at least one data set includes at least one graph database.

4. The method of claim 3, wherein the accessing the at least one data set using the result information includes traversing edges of the graph database from a vertex corresponding with the initial computer system element.

5. The method of claim 3, wherein the at least one data set and the graph database are associated with one or more data management systems.

6. The method of claim 1, comprising resetting a traversal algorithm to designate a new initial computer system element upon converting the second section to the contingency query portion.

7. A system for performing a single natural language query, the system comprising:
   a hardware processor; and
   a query engine implemented using the processor, wherein the query engine is configured for:
      receiving the single natural language query that includes aggregated free-form query information comprising a first section and a second section for requesting data pertaining to computer system elements of a computing system, wherein the second section is appended to the first section via a contingency clause, wherein the computer system elements comprise a plurality of physical resources and/or virtualized resources that are included in the computing system, tree;
      converting, using the syntax tree, the first section of the aggregated freeform query information into an original query portion, and contingency query portion for accessing at least one data set;
      accessing, using the original query portion, the at least one data set to obtain result information pertaining to an initial computer system element Included in the computing system; and
      in response to detecting the contingency clause, using the contingency query portion and the result information returned in response to the original query portion to access the at least one data set to obtain computer system element information as specified in the single natural language query by the contingency clause for at least one descendant element or ancestor element related to the initial computer system element included in the result information, wherein the initial computer system element and each of the at least one descendant element or ancestor element are separate elements of the syntax tree.

8. The system of claim 7, wherein the first section includes an original clause of the aggregated free-form query information and the second section includes a contingency clause that is appended to the original clause.

9. The system of claim 7, wherein the at least one data set includes at least one graph database.

10. The system of claim 9, wherein the query engine is further configured for traversing edges of the graph database from a vertex corresponding with the initial computer s stem element.

11. The system of claim 9, wherein the at least one data set and the graph database are associated with one or more data management systems.

12. The system of claim 7, wherein the query engine is further configured for resetting a traversal algorithm to establish a new initial computer system element upon converting the second section to the contingency query portion.

13. A non-transitory computer readable medium having stored thereon executable instructions which, when executed by a processor of a computer, cause the computer to perform steps comprising:

receiving a single natural language query that includes aggregated free-form query information comprising a first section and a second section for requesting data pertaining to computer system elements of a computing system, wherein the second section is appended to the first section via a contingency clause, wherein the computer system elements comprise a plurality of physical resources and/or virtualized resources that are included in the computing system, wherein the aggregated free-form query information is represented as a syntax tree;

converting, using the syntax tree, the first section of the aggregated free-form query information into an original query portion, and the second section of the aggregated free-form query information into a contingency query portion for accessing at least one data set;

accessing, using the original query portion, the at least one data set to obtain result information pertaining to an initial computer system element included in the computing system; and in response to detecting the contingency clause, using the contingency query portion and the result information returned in response to the original query portion to access the at least one data set to obtain computer system element information as specified in the single natural language query by the contingency clause for at least one descendant element or ancestor element related to the initial computer system element included in the result information, wherein the initial computer system element and each of the at least one descendant element or ancestor element are separate elements of the syntax tree.

14. The non-transitory computer readable medium of claim 13, wherein the first section includes an original clause of the aggregated free-form query information and the second section includes a contingency clause that is appended to the original clause.

15. The non-transitory computer readable medium of claim 13, wherein the at least one data set includes at least one graph database.

16. The non-transitory computer readable medium of claim 15, wherein accessing the at least one data set using the result information includes traversing edges of the graph database from a vertex corresponding with the initial computer system element.

17. The non-transitory computer readable medium of claim 13, comprising resetting a traversal algorithm to establish a new initial computer system element upon converting the second section to the contingency query portion.

* * * * *